United States Patent Office 3,449,479
Patented June 10, 1969

3,449,479
METHOD FOR COATING THE INTERIOR SURFACE OF A POLYOLEFIN ARTICLE WITH AN IMPERMEABLE POLYMER
Martin R. Cines, Bartlesville, Okla., assignor to Phillips Petroleum Company, a corporation of Delaware
No Drawing. Filed June 17, 1966, Ser. No. 558,259
Int. Cl. B29c 5/08
U.S. Cl. 264—92                                          9 Claims

ABSTRACT OF THE DISCLOSURE

Biaxially oriented polyolefin containers are produced by forming a parison, for instance, by injection molding or by extrusion of tubular material. The resulting parisons are thereafter coated with a thin layer of a vinyl halide polymer or copolymer and the coated parison reheated to a temperature within to 30 degrees below the crystalline melt point of the substrate so as to place the polyolefin parison in condition for being oriented on stretching. The coated parison is then stretched at orientation temperature and caused to conform to the shape of a mold by means of differential pressures so as to produce a biaxially oriented polyolefin container having a strongly adherent thin coating of a polymeric material which is relatively impermeable to oxygen and essential oils.

---

This invention relates to a polyolefin article which has coated on a surface a polymer which is relatively impermeable to essential oils and normally gaseous materials.

In one of its aspects, the invention relates to a process for producing a biaxially oriented polyolefin bottle having on its interior surface a highly adherent thin coating of a vinyl halide polymer or copolymer by blow molding a polyolefin having coated on the interior surface thereof the coating polymer, the molding taking place at a temperature range in which the polyolefin attains maximum orientation.

Polyolefin bottles have been proposed for commercial use. One problem with polyolefin bottles is that the polyolefin is permeable to both some liquids and vapors. These liquids and vapors include turpentine, soy bean oil, orange oil and other essential oils and oxygen. It has been proposed to coat the interior surface of the bottles with a material which is less permeable or a barrier to these materials. Among those materials proposed for use as the coating have been polyvinyl chloride and a copolymer of polyvinylidene chloride and acrylonitrile.

One method of producing a bottle having the desired coating on the interior surface is to first form the bottle and then apply the coating to the interior surface by filling the bottle with a solution of the desired coating material in a solvent, removing the excess liquid and evaporating the solvent. This method leaves a satisfactory coating except that the coating is only weakly adherent to the interior surface of the bottle and is thicker than that required. Further, this method is rather costly.

Many methods have been devised for making adherent coatings of polymers and the like on polyolefin substrates. Most of the methods require that at least one of the polymers be molten. These methods of making adherent coatings are not applicable to biaxially oriented polyolefin articles because in order to achieve such biaxially oriented polyolefin articles, it is necessary to mold them at the orientation temperature, i.e. below the melting point of the polyolefin.

A method has been disclosed for making a laminated container of polyethylene and polyvinyl chloride wherein polyethylene is formed on the inner surface and polyvinyl chloride is formed on the outer surface. In this method, a double tube is extruded, the inner one being polyethylene and the outer one being polyvinyl chloride and the double tube is placed into a blow molding machine and blow molded at molding temperatures. During this operation, the temperature used is the molding temperature of polyvinyl chloride, i.e. above the melting point of polyvinyl chloride, a temperature also above the softening point of the polyethylene. Thus, the polyethylene is molten during this blowing operation and the resultant container is not oriented.

I have now discovered that excellent adherence of a coating layer such as polyvinyl chloride or polyvinylidene chloride to a polyolefin substrate can be attained if the polyolefin parison is first coated with the coating material, heated to a temperature below the crystalline melt point for the polyolefin and blown at that temperature. By this method also, the thickness of the coating layer can be reduced to the desirable thickness.

By various aspects of this invention, one or more of the following, or other, objects can be obtained.

An object of this invention is to provide an oriented, strengthened polyolefin article with an adherent layer which is relatively impermeable to gases and liquids such as oxygen, aromatic and essential oils.

It is a further object of this invention to provide a process for the production of a polyolefin bottle having its interior surface coated by a polymer which is a barrier to oxygen and aromatic and essential oils whereby the maximum salvage value of unused parison can be obtained by masking of the parison during the coating operation.

A still further object of this invention is to provide a process for coating a polyolefin parison with a different polymeric material so that when the parison is molded by differential pressure a uniform, strongly adherent, thin coating results.

It is a still further object of this invention to provide a biaxially oriented polypropylene bottle with a strongly adherent interior layer consisting of a copolymer of vinylidene chloride and acrylonitrile.

Other aspects, objects, and the several advantages of this invention are apparent to one skilled in the art from a study of this disclosure and the appended claims.

According to the invention, there is provided a method for producing a polyolefin article having a strongly adherent layer coated thereon which is relatively impermeable to oxygen and essential oils and vapors thereof. A polyolefin substrate, such as a parison, is coated in the desirable areas with the desirable coating material. The coated substrate is then heated to a temperature below the crystalline melt point for the polyolefin, i.e. below the softening point, and then the substrate with the coating thereon is oriented and in some cases, simultaneously molded at that temperature.

In one embodiment, a blown bottle is produced by coating the interior surface of a hollow parison with a polymeric material containing chlorine such as polyvinyl chloride, or a copolymer of polyvinylidene chloride and acrylonitrile, heating the parison to its orientation temperature, and blowing the parison in a suitable mold to form the biaxially oriented bottle. This method has been found to produce a bottle having a thin, highly adherent, continuous coating of a relatively impermeable polymer on the inside thereof.

The polyolefin to which the invention is applicable includes polyethylene, polypropylene, polybutene-1 and copolymers thereof. Mixtures of polymers and copolymers can also be employed. Especially applicable polyolefins are those produced by the method described and claimed in U.S. 2,825,721 to John P. Hogan and Robert L. Banks.

Materials which are relatively impermeable to oxygen and to essential oils and which can be coated on the polyolefin substrate according to the invention include vinyl halide polymers and copolymers such as homopolymers of vinylchloride and vinylidene chloride; copolymers of vinyl halide with vinylidene chloride, vinylchloroacetate, chlorostyrene, chlorobutadiene; copolymers of vinylidene halides such as vinylidene chloride with carboxylic acid vinyl esters such as vinyl acetate, vinylpropionate, vinylbutyrate, vinylbenzoate, esters of unsaturated acids such as alkyl acrylates, aromatic vinyl compounds, dienes, unsaturated amides, unsaturated nitriles and unsaturated carboxylic acid esters.

The temperature to which the coated article is heated and stretched is a temperature below the crystalline melting point for the olefin polymer. It is a temperature at which an article could successfully be blown but below the softening or crystalline melt point of the polyolefin substrate. This temperature will generally be about 2°–30° F. below the softening point of the polyolefin substrate.

The crystalline melt point of polymers such as polypropylene and polyethylene can be determined by heating a small piece of plastic (usually film) under crossed polaroids in a microscope equipped with means for heating the polymer. The specimen is heated slowly and the crystalline melting point is the temperature at which birefringence disappears.

One method of coating the polyolefin substrate is to dissolve the coating material in a solvent, and apply the solution to the surface of the polyolefin substrate. The solvent can then be evaporated from the substrate leaving a weakly adherent coating. Solvents which are useful in this process include well known solvents for the materials including methyl ethyl ketone, toluene, dimethylsulfoxide, ethyl acetone, acetone, ethylene dichloride, trichloroethylene, dimethylformamide, tetrahydrofuran, cyclohexanone and mixtures of two or more of these and the like. A closed end parison may be coated by filling it with the solution then removing the excess solution leaving a coating of the polymer and solvent on the parison. The solvent is evaporated leaving a polymer coating on the interior surface of the parison.

Another method of coating the polyolefin substrate is to heat the polyolefin substrate to a temperature at which particles of the desired coating material will stick thereto. The coating material is then contacted in the form of particles with the polyolefin substrate. The particles will stick to the surface of the substrate and can be fused into a uniform layer by heating the same. The interior of a parison can be coated in this manner by passing through the center of a hollow parison a heated stream of gas containing the coating material in particle form. The gas containing the coating material in particle form can be supplied from a fluidized bed containing the same. A closed-end parison can be coated in this manner by heating the parison to the temperature at which the particles will stick, filling the parison with particles of the coating material and removing the excess. Then, as the parison is heated to the orientation temperature, the adhered coating particles fuse to form a continuous layer.

When the inherent softening temperature of the coating material is greater than that of the polyolefin substrate, then compounds such as plasticizers can be added to the coating material which compounds will lower the softening temperature of the coating material so that the coating material will fuse and form a substantially continuous coating layer. These compounds need not be added when a solvent is used to apply the coating material.

The invention in another embodiment includes masking of certain areas of the parison to prevent coating thereon. An area of the parison, such as the end of a tubular parison, can be masked with a material which will prevent coating material from reaching the parison substrate. Then when the final article is formed, that part of the parison which has been masked, will not have a coating thereon.

More specifically, the end portion of the parison in which the seal is to be formed can be prevented from having a coating thereon thereby allowing a better seal in the pinch-off area. Further, the discarded material will not contain any material except for the substrate. Thus, that portion of the parison which is cut off can be recycled to the parison forming operation. If the cut-off area contains coating material, for example, the cut-off material must be discarded and cannot be reused without special treatment to remove the coating which would be an incompatible contaminant during parison forming. Masking materials include sleeves made from Teflon or metal.

By the use of the invention, a strong, high impact strength polyolefin bottle can be produced by a simple economical method in which the bottle has coated on the interior surface a strongly adherent layer of a material which is relatively impermeable to aromatic and essential oils and vapors. This will allow the bottle to be used for all kinds of purposes including foods, drugs, cosmetics and chemicals. The method of the invention avoids a coating layer which is weakly adherent and will chip off, and avoids a coating layer which is thicker than that required.

Whereas the invention has been described with reference to blow molding, it is obvious that for the purposes of the invention other differential molding techniques such as vacuum molding can be employed.

While the invention has been described with reference to producing a bottle, it is obvious that other articles including all types of containers, can be coated by the invention, for example, tubing, film and sheet.

The following examples further exemplify the invention.

EXAMPLE I

An injection molded closed-end parison is made from polypropylene having a density of 0.90 gm./cc. (ASTM–D–1505–60T) and a melt flow of 5 gm./10 min. (ASTM–D–1238–60T) and an optical melting point of 340° F. The parison is heated to 330° F., then filled with powdered unmodified polyvinyl chloride having a particle size which will pass a standard 100 mesh sieve. The powder is retained in the heated parison for one minute. Then the excess powder is removed. A Teflon coated mandrel is inserted into the parison so as to lightly press and smooth the surface of the PVC particles coating the internal surface of the parison. The parison is then inserted into the blow molding apparatus and blown to form an oriented bottle capable of containing 8 ounces of water. The bottle is tested for permeability by filling it with orange oil and comparing the weight loss after a 24 hour period with a similar 8 ounce oriented polypropylene bottle filled with orange oil but not having the PVC coating. The PVC coated bottle loses 1.5 grams of orange oil and the uncoated bottle loses 2 grams. The permeation rate of the orange oil through the laminated bottle is reduced to ¾ of that through the unlaminated bottle. Tests show the oxygen permeation rate is reduced by ½ as a result of coating the interior of the bottle with PVC.

EXAMPLE II

An uncoated parison made from the same material and by the same method as that in Example I is placed in a parison heating block then filled with a 150° F. mixture of 35 cc. of unmodified polyvinyl chloride powder dissolved in 170 cc. of methyl ethyl ketone and 60 cc. of toluene. The mixture is withdrawn from the parison with a syringe leaving a coating of the solution on the interior walls of the parison. The parison remains in the heating block until it reaches a temperature of 330° F. Then it is removed from the block and inserted in a blow molding apparatus and blown to form an oriented bottle having an 8 ounce water capacity. Permeability rate tests with oxygen and with orange oil show a 43 percent and 21 percent reduction in permeability, respectively, as compared to similar uncoated bottles.

EXAMPLE III

A tubular polypropylene parison 3 inches long, 0.865 inch in diameter with a 0.122 inch thick wall is inserted into a heater block which contacts its exterior wall and the parison is heated to 330° F. A hollow mandrel is inserted into each end of the parison a distance of ½ inch. The mandrels are substantially in contact with the internal walls of the parison in the end portions. Unmodified polyvinyl chloride powder having a particle size which will pass a standard 100 mesh sieve is passed into the parison from one end, held there for one minute, then passed out through the other end leaving a coating of particles on the internal wall of the hot parison except in the end portions which are protected by the hollow mandrels. The hollow mandrels are removed and the parison is passed to a blow molding machine where one end is closed off less than ½ inch from the end and then severed, the uncoated severed portion being recycled to the parison extrusion machine, and the other end is inserted in a thread forming head about ½ inch and threads are formed in the uncoated portion. The parison is then stretched and blown into a bottle with a 10 ounce water capacity. Permeability rate tests using oxygen and orange oil reveal a 28 percent and 13 percent reduction in permeability, respectively, as compared to similar uncoated bottles. Also, the bottles when filled with water do not leak in the pinch-off area in the bottom ends.

EXAMPLE IV

Similar bottles are made but the hollow mandrels are inserted only ⅛ inch and then the parison is closed off and severed in a portion having an internal coating of PVC. Permeability tests could not be made since the pinched off area leaked liquids such as water. The severed end of the parison could not be recycled to the parison extrusion machine since it was contaminated with the PVC.

EXAMPLE V

An uncoated parison made from the same material and by the same method as that in Example I is placed in a parison heating block then filled with a 150° F. mixture of 25 cc. of a copolymer of 91:9 vinylidene chloride: acrylonitrile powder dissolved in 75 cc. of methyl ethyl ketone and 25 cc. of toluene. The mixture is withdrawn from the parison with a syringe leaving approximately a 1 mil coating of the solution on the interior walls of the parison. The parison remains in the heating block until it reaches a temperature of 330° F. Then it is removed from the block and inserted in a blow molding apparatus and blown to form an oriented bottle having an 8 ounce water capacity. Permeability rate tests with oxygen and with orange oil show an 83 percent and a 66 percent reduction in permeability, respectively, as compared to similar uncoated bottles.

EXAMPLE VI

A mixture of 25 cc. of a copolymer of 91:9 vinylidene chloride: acrylonitrile powder is dissolved in 75 cc. of methyl ethyl ketone and 25 cc. of toluene. The solution is sprayed and brushed on two polypropylene sheets. Both sheets are then oven heated to 330° F., thus evaporating the solvent and leaving a polymer coating on their surfaces. One sheet is allowed to cool while the other sheet is immediately oriented by stretching it biaxially in a tenter frame type stretching device to one-tenth its original thickness. A thinner coating is placed on the sheet which is not to be stretched so that the coating thickness of the stretched and unstretched sheets are approximately the same. After both sheets are at room temperature, several small ¼ inch squares are cut in each sample through the coating and into the polypropylene substrate. A pressure sensitive adhesive tape is firmly applied to the coated surface over each of these squares and then removed by lifting one end. All of the squares of coating material are removed with the tape from the unstretched sample whereas none of the squares are removed from the stretched sample, thus evidencing the strongly adherent nature of the coating on the oriented sample.

I claim:
1. A method for producing a biaxially oriented polyolefin container having a strongly adherent thin coating of a polymeric material which is relatively impermeable to oxygen and essential oils, said method comprising: forming a tubular polyolefin parison; masking a portion of said tubular parison which is to form one end of said container whereby said masked portion is thereby prevented from having said coating material applied thereto; thereafter applying to the inner surface of said parison a thin layer of a vinyl halide polymer or copolymer coating material, and heating said parison to a temperature 2–30° F. below the crystalline melt point for said polyolefin comprising said substrate, at which temperature said polyolefin is susceptible to orientation on stretching; thereafter, stretching said polyolefin parison and said thin layer of polymeric coating material while in contact with each other, and applying differential pressure to cause said parison to conform to a mold.

2. A process according to claim 1 wherein said coating step comprises contacting said interior surface of said parison with a solvent having dissolved therein said coating material, and evaporating the solvent from the surface of said parison, thereby leaving a coating of said coating material.

3. A method according to claim 1 wherein said interior surface of said parison is coated by contacting the same with a fluidized bed of particles of said coating material, said parison having been heated to a temperature at which said particles will adhere to the interior surface thereof, and fusing said particles which have adhered to said interior surface into a continuous coating layer.

4. A method according to claim 1 wherein said coating step comprises heating said parison to a temperature at which particles of said coating material will adhere to the surface thereof, filling said heated parison with particles of said coating material, removing all particles of said coating material which do not adhere to the interior surface of said parison, and fusing said particles which have adhered to the interior surface of said parison to form a continuous coating on the interior surface of said parison.

5. A method according to claim 1 wherein said polyolefin is polypropylene.

6. A method according to claim 1 wherein said coating material is a polymer of vinylidene chloride.

7. A process according to claim 1 wherein said polyolefin is polyethylene.

8. A process according to claim 1 wherein said coating material is polyvinyl chloride.

9. A method according to claim 1 wherein said coating material is a copolymer of vinylidene chloride and acrylonitrile.

References Cited

UNITED STATES PATENTS

| | | | |
|---|---|---|---|
| 3,285,766 | 11/1966 | Barkis et al. | 117—7 |
| 3,322,553 | 5/1967 | Seifried et al. | 117—7 |
| 3,068,516 | 12/1962 | Hofer | 264—95 |
| 3,312,762 | 4/1967 | Wechsler et al. | 264—131 X |
| 3,347,966 | 10/1967 | Seefluth | 264—94 X |

DONALD J. ARNOLD, *Primary Examiner.*

F. H. SIBBAUGH, *Assistant Examiner.*

U.S. Cl. X.R.

117—7, 21; 264—94